US012253236B1

(12) United States Patent
Baldwin et al.

(10) Patent No.: US 12,253,236 B1
(45) **Date of Patent: *Mar. 18, 2025**

(54) TAMPER RESISTANT NIGHTLIGHT

(71) Applicant: Titan3 Technology LLC, Tempe, AZ (US)

(72) Inventors: Jeffrey P. Baldwin, Anthem, AZ (US); John E. Klein, Chandler, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,469

(22) Filed: Aug. 25, 2023

Related U.S. Application Data

(63) Continuation of application No. 17/752,045, filed on May 24, 2022, now Pat. No. 11,774,055, which is a continuation of application No. 17/138,624, filed on Dec. 30, 2020, now Pat. No. 11,339,934.

(51) Int. Cl.

| | |
|---|---|
| ***F21S 8/00*** | (2006.01) |
| ***F21V 15/01*** | (2006.01) |
| ***F21V 23/06*** | (2006.01) |
| ***H01R 13/447*** | (2006.01) |
| ***H01R 13/717*** | (2006.01) |

(52) U.S. Cl.
CPC .............. *F21S 8/035* (2013.01); *F21V 15/01* (2013.01); *F21V 23/06* (2013.01); *H01R 13/447* (2013.01); *H01R 13/717* (2013.01)

(58) Field of Classification Search
CPC .......... F21S 8/035; F21V 15/01; F21V 23/06; H01R 13/447; H01R 13/717
See application file for complete search history.

(56) References Cited

U.S. PATENT DOCUMENTS 3,522,595 A * 8/1970 White .................... G08B 17/06 337/380
3,739,226 A 6/1973 Seiter
4,000,405 A 12/1976 Horwinski
4,484,185 A 11/1984 Graves
4,546,419 A 10/1985 Johnson
4,915,638 A 4/1990 Domian
5,481,442 A * 1/1996 Dickie ................... H01R 24/68 439/373
5,964,516 A 10/1999 Lai
6,045,232 A 4/2000 Buckmaster
(Continued)

*Primary Examiner* — Tsion Tumebo
(74) *Attorney, Agent, or Firm* — Kenneth C. Booth; Jeffrey D. Merrill; Booth Udall Fuller, PLC

(57) ABSTRACT

A tamper resistant nightlight comprising a body and a housing. The body may comprise a base, a cover coupled to the base, and at least one circuit located between the base and the cover. The base is configured to be disposed over a face of an electrical outlet. The at least one circuit comprises at least one light. The body may also comprise a plurality of plug apertures extending through the cover and through the base. The plurality of plug apertures is configured to align with an electrical receptacle on the electrical outlet. The housing is coupled to the body and comprises a locking element configured to restrict a child from removing the tamper resistant nightlight from the electrical outlet. The locking element may be configured as a flange that extends away from the body and behind a rear surface of an electrical wall plate associated with the electrical outlet.

20 Claims, 8 Drawing Sheets

(56) References Cited

U.S. PATENT DOCUMENTS

| | | | | |
|---|---|---|---|---|
| 6,883,927 | B2 | 4/2005 | Cunningham | |
| 7,247,793 | B2 | 7/2007 | Hinkson | |
| 7,874,717 | B1 | 1/2011 | Shaefer | |
| 8,304,652 | B2 | 11/2012 | Mcbain | |
| 8,393,747 | B2 | 3/2013 | Kevelos | |
| 8,399,765 | B1 * | 3/2013 | Baldwin | H02G 3/14 174/67 |
| 8,674,221 | B2 | 3/2014 | Yang | |
| 9,970,641 | B2 | 5/2018 | Mousavi | |
| 10,305,216 | B1 | 5/2019 | Shotey | |
| 10,446,970 | B2 | 10/2019 | Shotey | |
| 10,644,465 | B2 | 5/2020 | O'Reilly | |
| 10,720,727 | B1 | 7/2020 | Shotey | |
| 11,489,323 | B1 * | 11/2022 | Baldwin | H02G 3/14 |
| 2004/0142601 | A1 * | 7/2004 | Luu | H01R 25/006 439/652 |
| 2006/0073731 | A1 | 4/2006 | Chien | |
| 2006/0198142 | A1 | 9/2006 | Dickie | |
| 2008/0068822 | A1 * | 3/2008 | Spartano | H01R 13/447 362/95 |
| 2014/0140064 | A1 | 5/2014 | Trolese | |
| 2015/0276178 | A1 | 10/2015 | Chien | |
| 2017/0356638 | A1 | 12/2017 | Mousavi | |
| 2018/0316145 | A1 | 11/2018 | Mckiernan | |

* cited by examiner

TAMPER RESISTANT NIGHTLIGHT

CROSS REFERENCE TO RELATED APPLICATIONS

This is a continuation of U.S. patent application Ser. No. 17/752,045 entitled "Tamper Resistant Nightlight," filed on May 24, 2022, which is a continuation of U.S. patent application Ser. No. 17/138,624 entitled "Tamper Resistant Nightlight," filed on Dec. 30, 2020, and issuing as U.S. Pat. No. 11,339,934 on May 24, 2022, the disclosures of which are hereby incorporated herein by reference. This application also claims priority to expired provisional patent application No. 62/795,805 entitled "Tamper Resistant Nightlight," filed on Jan. 23, 2019, the disclosure of which is hereby incorporated by herein by reference.

TECHNICAL FIELD

Aspects of this document relate generally to nightlights, and more specifically to tamper-resistant nightlights.

BACKGROUND

Nightlights are a small light feature, usually electrical, placed for comfort or convenience in dark areas or areas that may become dark at certain times, such as at night or in an emergency. Nightlights are sometimes battery powered, and sometimes have a cord that allows them to be plugged into an electrical receptacle at an electrical outlet while being positioned away from the electrical receptacle. Nightlights are sometimes plugged into an electrical receptacle without an electrical cord, providing light at the location of or in the proximity to the electrical outlet.

SUMMARY

Aspects of this document relate to a tamper resistant nightlight, comprising a body, comprising a base that is configured to be disposed over a face of an electrical outlet having two electrical receptacles, at least one circuit disposed on the base, the at least one circuit comprising at least one light, a cover that is aligned with and disposed over the at least one circuit and coupled to the base so that the base is between the cover and the electrical outlet when the tamper resistant nightlight is plugged into the electrical outlet, and a plurality of plug apertures extending through the cover and through the base, the plurality of plug apertures configured to align with a first electrical receptacle of the two electrical receptacles, and a housing coupled to the body, the housing comprising a locking element configured to restrict a child from removing the tamper resistant nightlight from the electrical outlet, the locking element configured as a flange that extends away from the body such that a distal edge of the flange is configured to be positioned behind a rear surface of an electrical wall plate associated with the electrical outlet to restrict the tamper resistant nightlight from being removed from the electrical outlet while the electrical wall plate is coupled to the electrical outlet.

Particular embodiments may comprise one or more of the following features. The housing may comprise a translucent material and is disposed over a front of the cover. The housing may further comprise at least one plug opening extending through the housing and aligned with the plurality of plug apertures. The body may further comprise a photosensor configured to detect ambient light and turn on the tamper resistant nightlight when ambient light is low and turn off the tamper resistant nightlight when ambient light is adequate. The cover and the housing may be formed as a single piece. The flange may comprise a thickness in a range of 0.5 mm-4 mm.

According to an aspect of the disclosure, a tamper resistant nightlight may comprise a body comprising at least one light and a plurality of plug apertures extending from a front side of the body through a rear side of the body configured to align with a first electrical receptacle of an electrical outlet, and a housing coupled to the body, the housing comprising a locking element configured to restrict the tamper resistant nightlight from being removed from the electrical outlet while the electrical wall plate is coupled to the electrical outlet.

Particular embodiments may comprise one or more of the following features. The locking element may be configured to restrict the tamper resistant nightlight from being removed from the electrical outlet unless the electrical wall plate is removed from the electrical outlet. The locking element may be configured as a flange that extends away from the body such that a distal edge of the flange is configured to be positioned behind a rear surface of the electrical wall plate to restrict the tamper resistant nightlight from being removed from the electrical outlet while the electrical wall plate is coupled to the electrical outlet. The housing may comprise a translucent material and is disposed over the front side of the body. The body may further comprise a photosensor configured to detect ambient light and turn on the tamper resistant nightlight when ambient light is low and turn off the tamper resistant nightlight when ambient light is adequate. The housing further may further comprise at least one plug opening extending through the housing and aligned with the plurality of plug apertures. The body and the housing may be formed as a single piece.

According to an aspect of the disclosure, a tamper resistant nightlight may comprise a body comprising at least one light and a plurality of plug apertures extending from a front side of the body through a rear side of the body configured to align with a first electrical receptacle of an electrical outlet, and plug blades extending from the body and electrically coupled to the at least one light, the plug blades configured to electrically couple with contacts within a second electrical receptacle of the electrical outlet, different from the first electrical receptacle.

Particular embodiments may comprise one or more of the following features. A housing coupled to the body, the housing comprising a locking element configured to restrict a child from removing the tamper resistant nightlight from the electrical outlet. The housing may comprise a translucent material and is disposed over the front side of the body. The housing may further comprise at least one plug opening extending through the housing and aligned with the plurality of plug apertures. The body may further comprise a locking element configured to restrict the tamper resistant nightlight from being removed from the electrical outlet while the electrical wall plate is coupled to the electrical outlet. The locking element may be configured as a flange that extends away from the body such that a distal edge of the flange is configured to be positioned behind a rear surface of an electrical wall plate associated with the electrical outlet. The plurality of plug apertures may be electrically coupled to the plug blades and the plug blades are configured to provide power to the plurality of plug apertures when power is provided to the plug blades.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
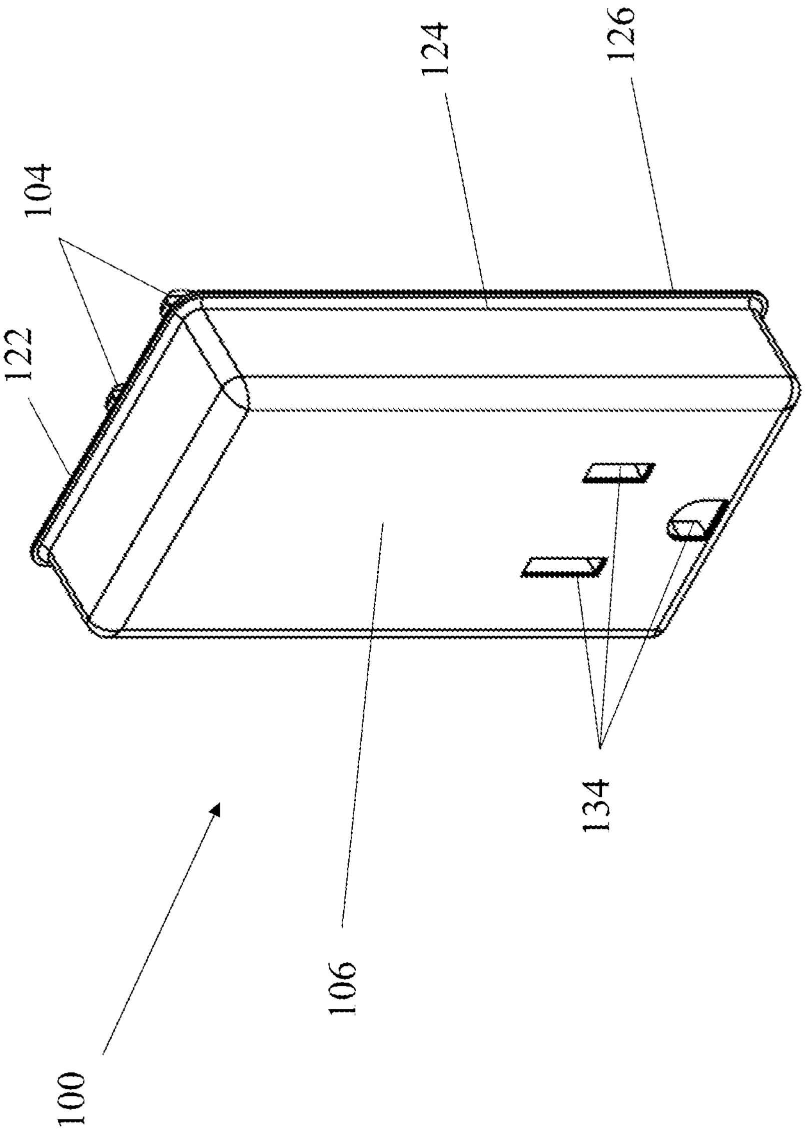
FIG. 1 is a perspective view of a first embodiment of the tamper resistant nightlight.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure concerns a tamper-resistant nightlight 100. The tamper-resistant nightlight 100 is configured to couple with an electrical outlet and restrict a child from removing the tamper-resistant nightlight 100 from the electrical outlet. A variety of different implementations of the tamper-resistant nightlight 100 are discussed below. It should be understood that the components depicted and discussed are non-limiting examples, and that the contemplated components may be combined with any of the other components in other implementations.

The tamper-resistant nightlight 100 may comprise one or more of a body 102, plug blades 104, and a housing 106, 107. FIGS. 1-5 illustrate a first embodiment of the tamper-resistant nightlight 100. The body 102 comprises at least one light 108 and may also comprise a plurality of plug apertures 110. The plurality of plug apertures 110 may extend completely through the body 102, from a front side 112 of the body 102 through a rear side (not shown) of the body 102. The plurality of plug apertures 110 are configured to align with a first electrical receptacle 116 of an electrical outlet 118. The plug blades 104 extend from the body 102 and are electrically coupled to the at least one light 108. In addition, the plug blades 104 are configured to electrically couple with contacts within a second electrical receptacle 120 of the electrical outlet 118. The second electrical receptacle 120 is different from the first electrical receptacle 116. Thus, when the tamper-resistant nightlight 100 is inserted into the second electrical receptacle 120, the body 102 covers the first electrical receptacle 116. However, the first electrical receptacle 116 is aligned with the plurality of plug apertures 110, allowing a different electrical device to be plugged into the first electrical receptacle 116 through the body 102. The plurality of plug apertures 110 may be electrically coupled to the plug blades 104. In such an embodiment, the plug blades 104 are configured to provide power to the plurality of plug apertures 110 when power is provided to the plug blades 104. Thus, a plug inserted into the first electrical receptacle 116 through the body 102 may receive power from the plurality of plug apertures 110 instead of or in addition to the first electrical receptacle 116. A related application is currently pending as application Ser. No. 16/750,956, filed Jan. 23, 2020 to Baldwin et al., titled TAMPER-RESISTANT NIGHTLIGHT, the disclosure of which is incorporated herein.

The housing 106, 107 is coupled to the body 102 and may comprise a locking element 122. The locking element 122 is configured to restrict a child from removing the tamper-resistant nightlight 100 from the electrical outlet 118. In some embodiments, the locking element 122 is configured as a flange 124 that extends away from the body 102 such that a distal edge 126 of the flange 124 is configured to be positioned behind a rear surface 128 of an electrical wall plate 130 associated with the electrical outlet 118 (see FIG. 4). In such an embodiment, the locking element 122 is configured to restrict the tamper-resistant nightlight 100 from being removed from the electrical outlet 118 unless the electrical wall plate 130 is removed from the electrical outlet 118. In other embodiments, the locking element 122 is configured to restrict the tamper-resistant nightlight 100 from being removed from the electrical outlet while the electrical wall plate 130 is coupled to the electrical outlet 118. The flange 124 may comprise a thickness in a range of 0.5 mm-4 mm. In some embodiments, the housing 106, 107 and the body 102 are formed as a single piece, and the body 102 comprises the locking element 122 as described.

Figure 6:
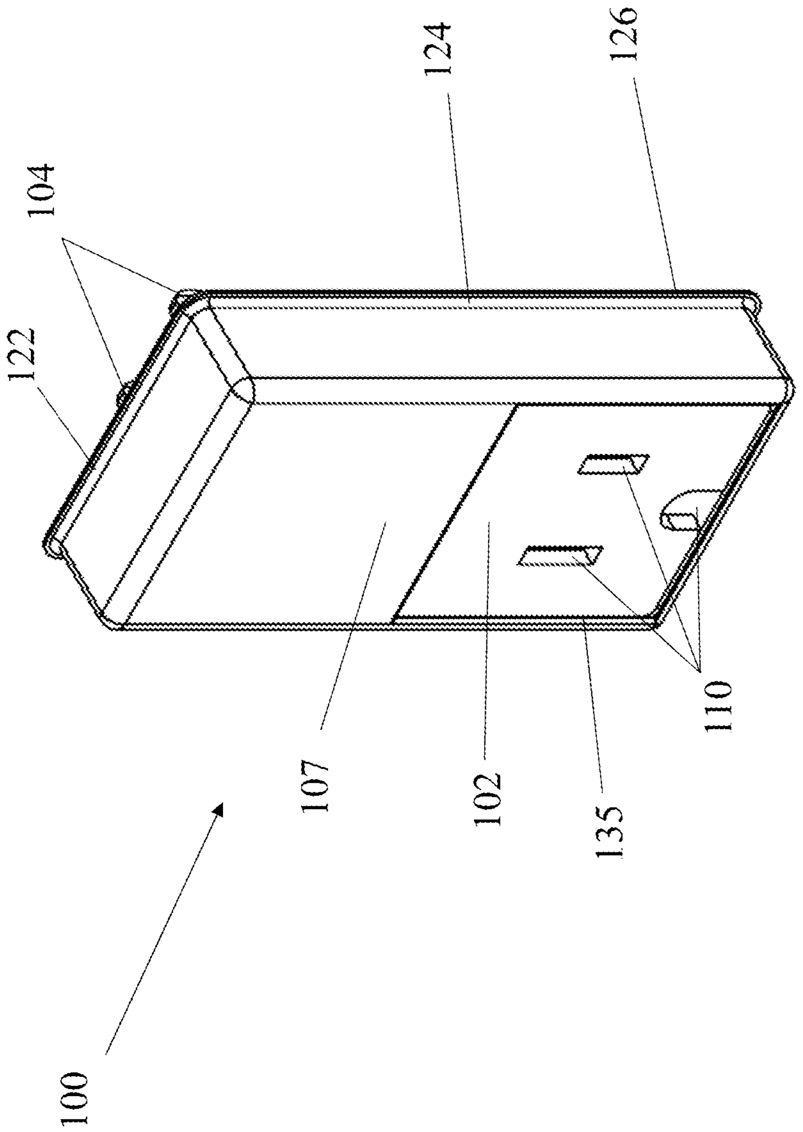
FIG. 6 is a perspective view of a second embodiment of the tamper resistant nightlight.
Figure 7:
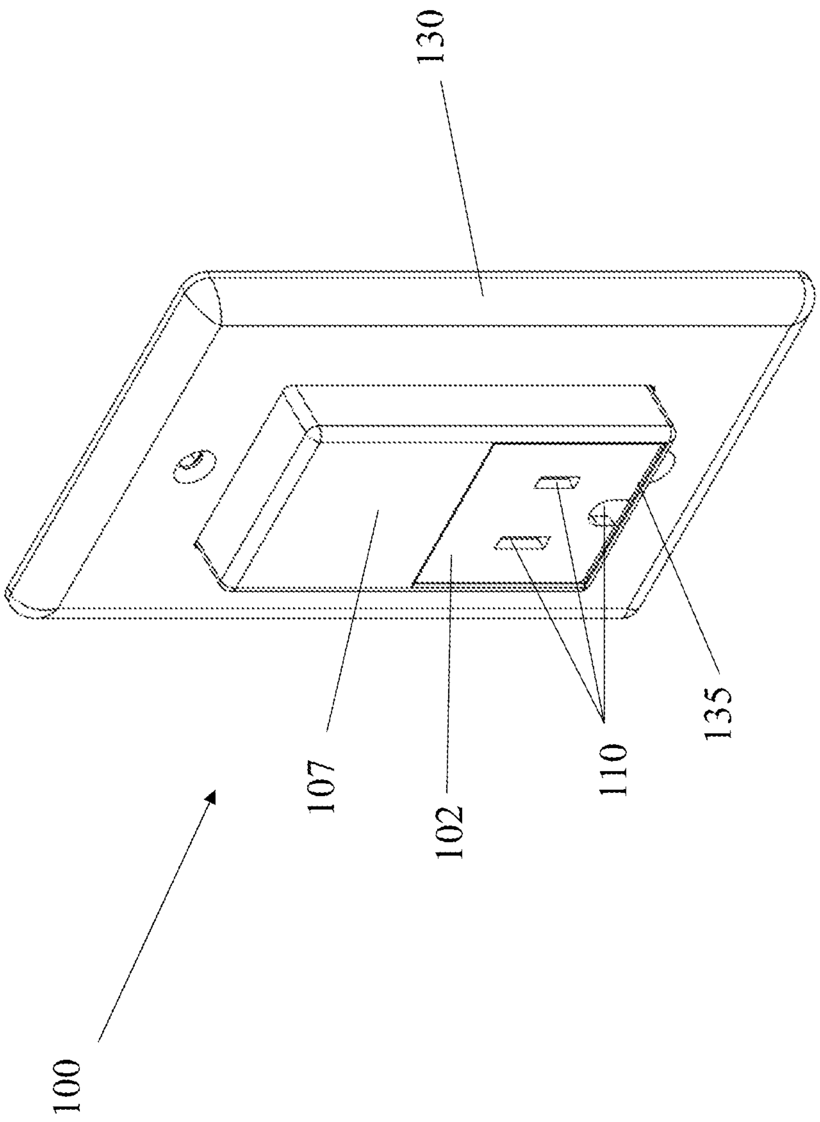
FIG. 7 is a perspective view of the tamper resistant nightlight shown in FIG. 5 installed in an electrical outlet.

The housing 106, 107 may be disposed over the front side 112 of the body 102. In such an embodiment, the housing 106, 107 holds the body 102 in place unless the housing 106, 107 is removed. For embodiments that include a locking element 122, the body 102 is thus locked to the electrical outlet 118. The housing 106, 107 may comprise a translucent material, allowing the at least one light 108 to shine through the housing 106, 107. The housing 106 may also comprise at least one plug opening 134 extending through the housing 106 (see FIGS. 1-3). Alternatively, the housing 107 may comprise at least one plug opening 135 extending through the housing 107 (see FIGS. 6-8). The at least one plug opening 134, 135 is aligned with the plurality of plug apertures 110, allowing a plug to be inserted into the plurality of plug apertures 110 when the housing 106, 107 covers the body 102. The at least one plug opening 134 may be at least two plug openings 134. In the embodiment shown in FIGS. 1-3, the at least one plug opening 134 is three plug openings 134. In embodiments with two or three plug openings 134, each plug opening 134 of the at least two plug openings 134 is configured to receive one of the prongs of an electrical plug. On the other hand, the embodiment shown in FIGS. 6-8 has one plug opening 135. When the housing 107 has one plug opening 135, the plug opening 135 is configured to allow all of the prongs of the electrical plug to couple with the body 102 through the one plug opening 135.

Figure 2:
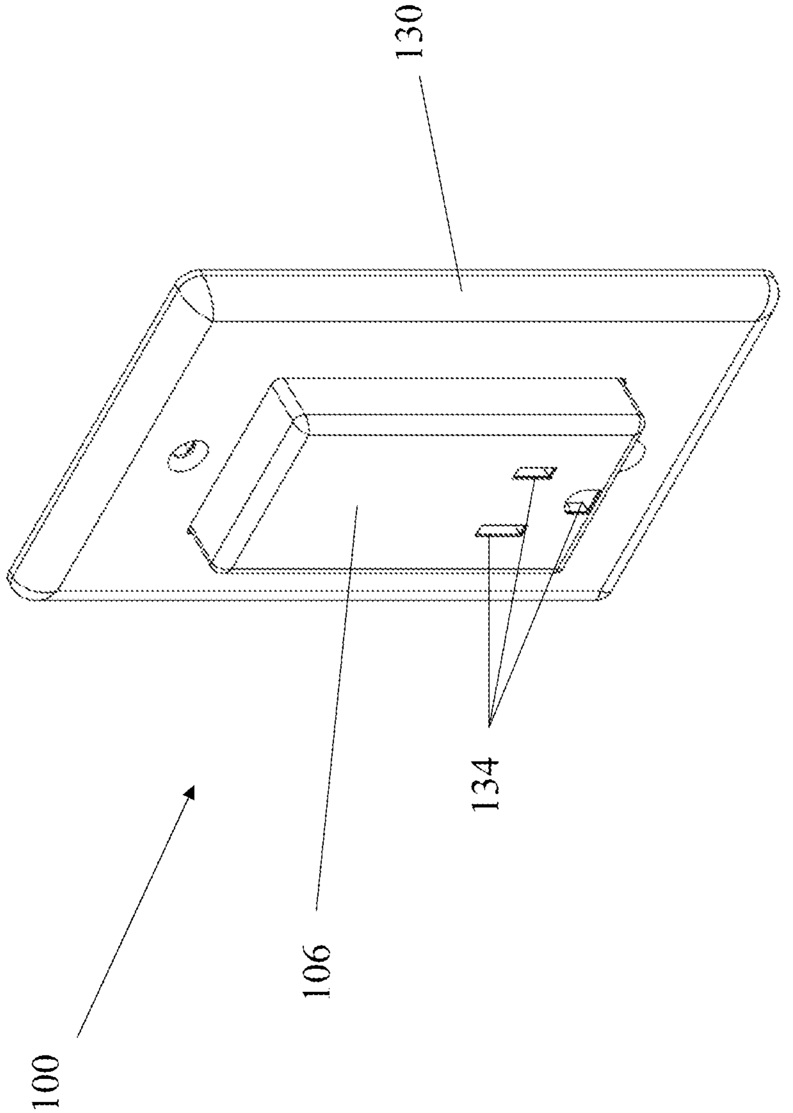
FIG. 2 is a perspective view of the tamper resistant nightlight shown in FIG. 1 installed in an electrical outlet.
Figure 3:
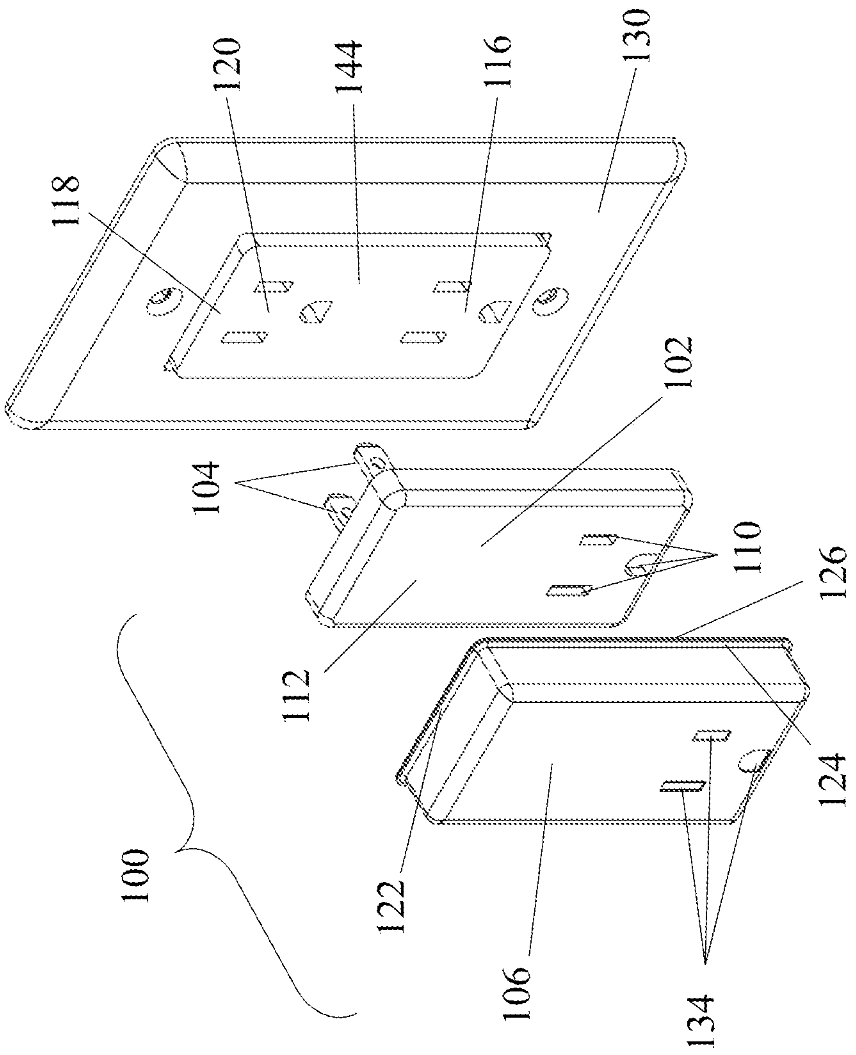
FIG. 3 is an exploded view of the tamper resistant nightlight shown in FIG. 1 with an electrical outlet.
Figure 4:
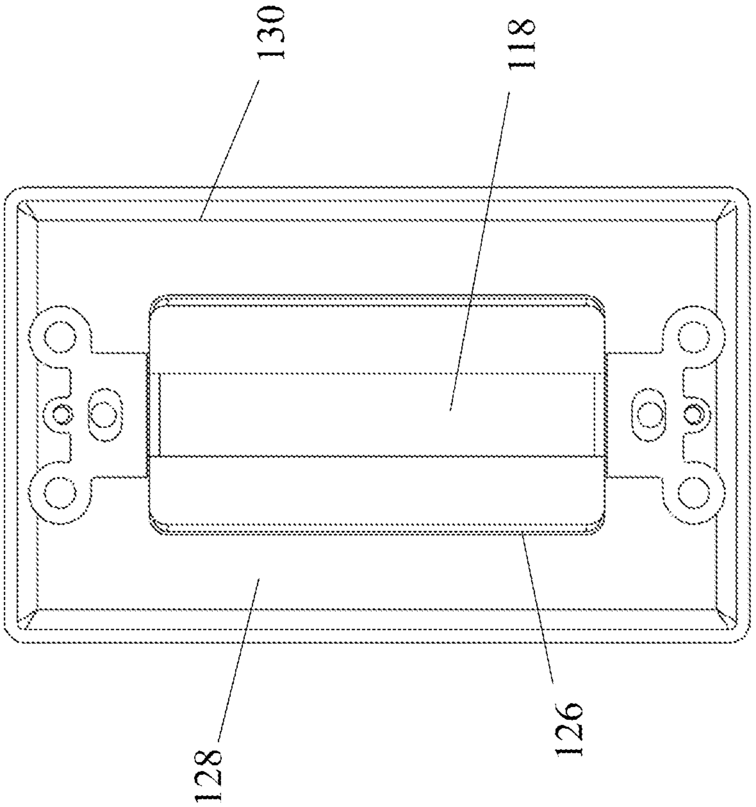
FIG. 4 is a rear view of the tamper resistant nightlight shown in FIG. 1 installed in an electrical outlet.
Figure 5:
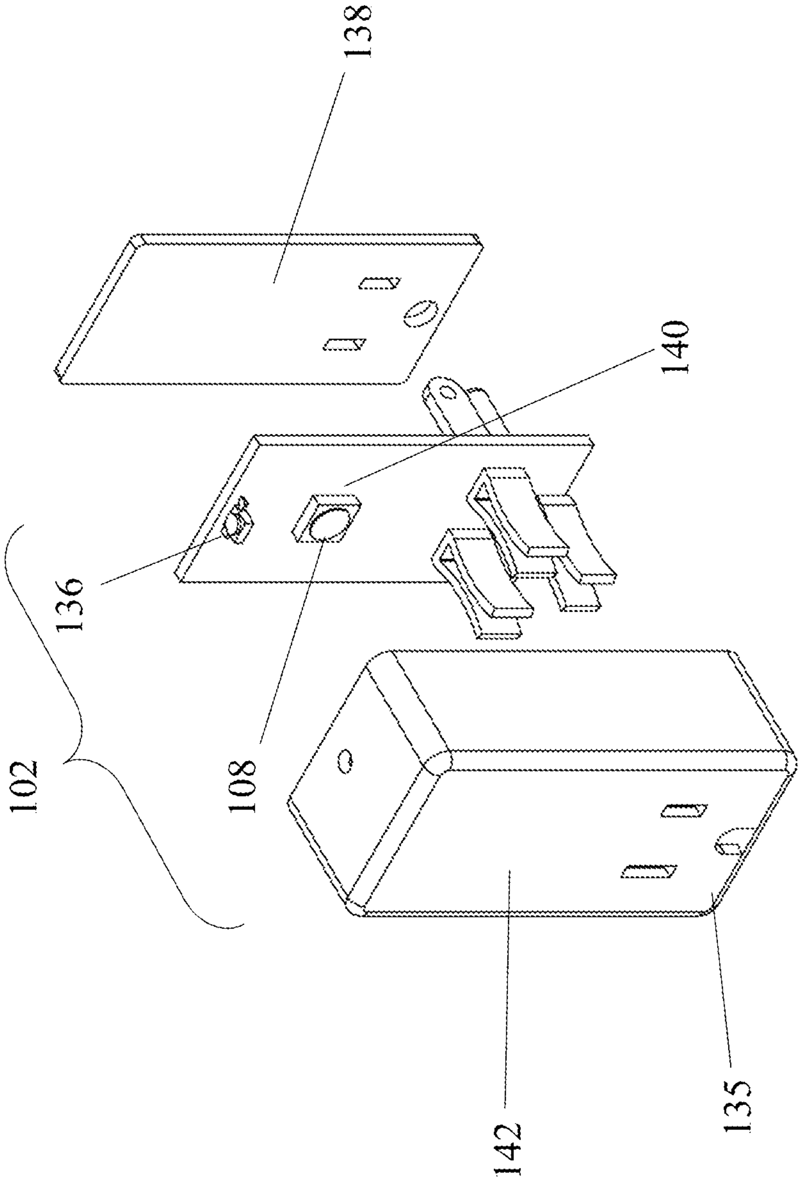
FIG. 5 is a front view of the body of the tamper resistant nightlight shown in FIG. 1 with the front side removed to show the interior.
Figure 8:
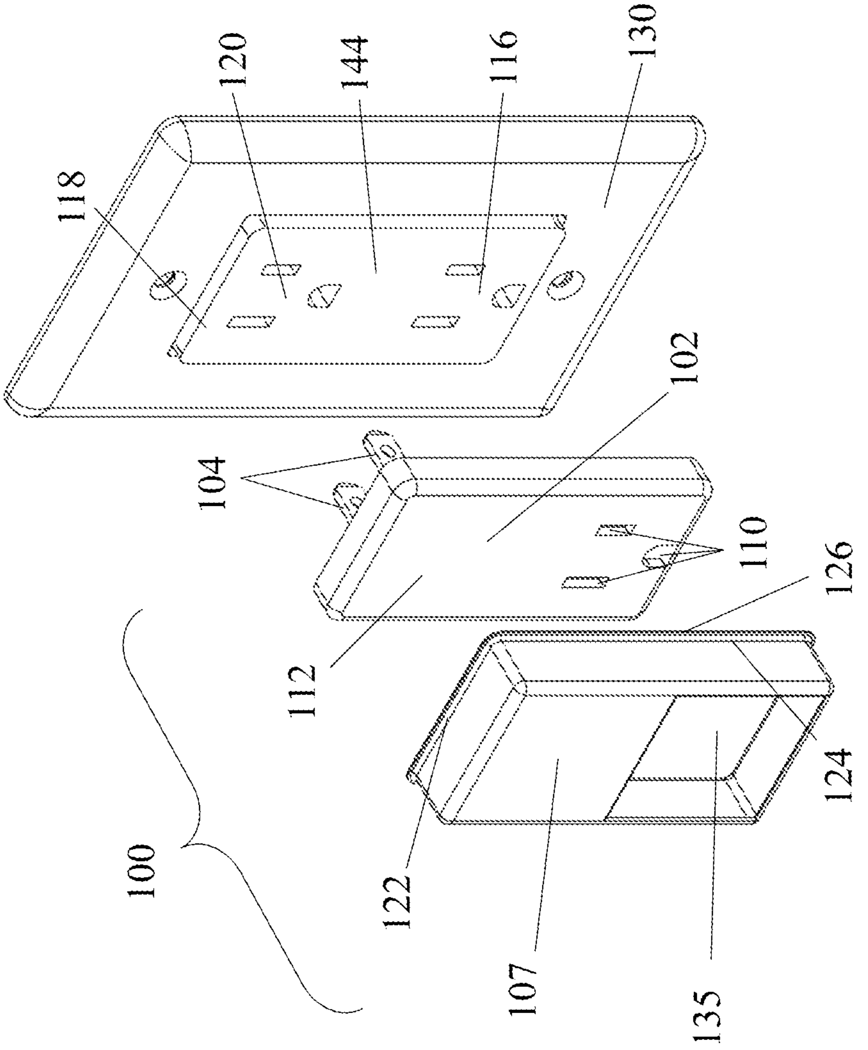
FIG. 8 is an exploded view of the tamper resistant nightlight shown in FIG. 5 with an electrical outlet.

Referring back to FIG. 5, the body 102 may comprise a base 138, at least one circuit 140 on a circuit board, and a cover 142. The base 138 is configured to be disposed over a face 144 of the electrical outlet 118 (FIGS. 2, 8). The at least one circuit 140 is disposed on the base 138 and comprises the at least one light 108. The cover 142 is aligned with and disposed over the at least one circuit 140 and coupled to the base 138. When the tamper-resistant nightlight 100 is plugged into the electrical outlet 118, the base 138 may be between the cover 142 and the electrical outlet 118. In embodiments with a cover 142 and a base 138, the plurality of plug apertures 110 extend completely through the body 102, and therefore extend through the cover 142 and through the base 138. The tamper-resistant nightlight 100 may also comprise a photosensor 136 exposed on the body 102. The photosensor 136 is configured to detect ambient light and turn on the tamper-resistant nightlight 100 when ambient light is low and turn off the tamper-resistant nightlight 100 when ambient light is adequate.

It will be understood that implementations of a tamper-resistant nightlight are not limited to the specific assemblies, devices and components disclosed in this document, as virtually any assemblies, devices and components consistent with the intended operation of a tamper-resistant nightlight may be used. Accordingly, for example, although particular tamper-resistant nightlights, and other assemblies, devices and components are disclosed, such may include any shape, size, style, type, model, version, class, measurement, concentration, material, weight, quantity, and/or the like consistent with the intended operation of tamper-resistant nightlights. Implementations are not limited to uses of any specific assemblies, devices and components; provided that the assemblies, devices and components selected are consistent with the intended operation of a tamper-resistant nightlight.

Accordingly, the components defining any tamper-resistant nightlight may be formed of any of many different types of materials or combinations thereof that can readily be formed into shaped objects provided that the components selected are consistent with the intended operation of a tamper-resistant nightlight implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various tamper-resistant nightlights may be manufactured using conventional procedures as added to and improved upon through the procedures described here. Some components defining a tamper-resistant nightlight may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling tamper-resistant nightlights are not limited to the specific order of steps as disclosed in this document. Any steps or sequence of steps of the assembly of a tamper-resistant nightlight indicated herein are given as examples of possible steps or sequence of steps and not as limitations, since various assembly processes and sequences of steps may be used to assemble tamper-resistant nightlights.

The implementations of a tamper-resistant nightlight described are by way of example or explanation and not by way of limitation. Rather, any description relating to the foregoing is for the exemplary purposes of this disclosure, and implementations may also be used with similar results for a variety of other applications employing a tamper-resistant nightlight.

What is claimed is:

1. A tamper resistant nightlight, comprising:

a body configured to be positioned on a face of an electrical outlet without obstructing access to a first electrical receptacle of the electrical outlet, wherein an electrical wall plate surrounds the electrical outlet;

at least two plug blades extending from a rear side of the body and configured to electrically couple with contacts within a second electrical receptacle of the electrical outlet different from the first electrical receptacle; and a locking element coupled to the body and configured to restrict the tamper resistant nightlight from being removed from the electrical outlet unless the electrical wall plate is removed from the electrical outlet.

2. The tamper resistant nightlight of claim 1, further comprising a housing comprising the locking element and at least one plug opening extending through the housing, wherein the at least one plug opening is aligned with the first electrical receptacle.

3. The tamper resistant nightlight of claim 2, wherein the body and the housing are formed as a single piece.

4. The tamper resistant nightlight of claim 2, wherein the tamper resistant nightlight is physically removable from the electrical wall plate.

5. The tamper resistant nightlight of claim 1, the body further comprising a photosensor configured to detect ambient light and turn on the tamper resistant nightlight when ambient light is low and turn off the tamper resistant nightlight when ambient light is adequate.

6. The tamper resistant nightlight of claim 1, the body having at least one plug aperture extending from a front side of the body through the rear side of the body configured to align with the first electrical receptacle of the electrical outlet.

7. A tamper resistant nightlight, comprising:

a body having a light source, the body configured to be positioned on a face of an electrical outlet without obstructing access to a first electrical receptacle of the electrical outlet; and a housing coupled to the body, the housing having at least one plug opening extending through the housing and aligned with the first electrical receptacle, wherein the housing is configured to extend rearward toward the electrical outlet, insert between the electrical outlet and an electrical wall plate surrounding the electrical outlet, and contact a rear surface of the electrical wall plate.

8. The tamper resistant nightlight of claim 7, further comprising at least two plug blades extending from a rear side of the body and configured to electrically couple with contacts within a second electrical receptacle of the electrical outlet different from the first electrical receptacle.

9. The tamper resistant nightlight of claim 7, wherein the body and the housing are formed as a single piece.

10. The tamper resistant nightlight of claim 7, the body having at least one plug aperture extending from a front side of the body through a rear side of the body configured to align with the first electrical receptacle of the electrical outlet.

11. The tamper resistant nightlight of claim 7, the body further comprising a photosensor configured to detect ambient light and turn on the tamper resistant nightlight when ambient light is low and turn off the tamper resistant nightlight when ambient light is adequate.

12. The tamper resistant nightlight of claim 7, wherein the housing has a flange configured to contact the rear surface of the electrical wall plate, wherein the flange comprises a thickness in a range of 0.5 mm-4 mm.

13. The tamper resistant nightlight of claim 7, the housing having a flange that extends away from the body such that a distal edge of the flange is configured to be positioned behind a rear surface of the electrical wall plate to restrict the tamper resistant nightlight from being removed from the electrical outlet unless the electrical wall plate is removed from the electrical outlet.

14. A tamper resistant nightlight, comprising:

a body configured to be positioned on a face of an electrical outlet without obstructing access to a first electrical receptacle of the electrical outlet; and a housing coupled to the body, the housing having at least one plug opening extending through the housing and aligned with the first electrical receptacle, wherein the housing is configured to extend rearward toward the electrical outlet, insert between the electrical outlet and an electrical wall plate surrounding the electrical outlet, and restrict the tamper resistant nightlight from being removed from the electrical outlet.

15. The tamper resistant nightlight of claim 14, further comprising at least two plug blades extending from the body and configured to electrically couple with contacts within a second electrical receptacle of the electrical outlet, different from the first electrical receptacle.

16. The tamper resistant nightlight of claim 14, wherein the body and the housing are formed as a single piece.

17. The tamper resistant nightlight of claim 14, the body having at least one plug aperture extending from a front side of the body through a rear side of the body configured to align with the first electrical receptacle of the electrical outlet.

18. The tamper resistant nightlight of claim 14, the body further comprising a photosensor configured to detect ambient light and turn on the tamper resistant nightlight when ambient light is low and turn off the tamper resistant nightlight when ambient light is adequate.

19. The tamper resistant nightlight of claim 14, wherein the housing comprises a translucent material and is disposed over a front of the body.

20. The tamper resistant nightlight of claim 14, the housing having a locking element configured as a flange that extends away from the body such that a distal edge of the flange is configured to be positioned behind a rear surface of the electrical wall plate to restrict the tamper resistant nightlight from being removed from the electrical outlet while the electrical wall plate is coupled to the electrical outlet.

* * * * *